United States Patent
Liu et al.

(10) Patent No.: US 9,167,555 B2
(45) Date of Patent: Oct. 20, 2015

(54) PAGING AN IDLE STATE ELECTRONIC DEVICE

(71) Applicant: Rogers Communications Inc., Toronto (CA)

(72) Inventors: Jianming Liu, Markham (CA); Paul Borong Zheng, Markham (CA); Jun Ma, Markham (CA); Lixin Shi, Mississauga (CA); Jianguo Feng, Mississauga (CA)

(73) Assignee: ROGERS COMMUNICATIONS INC., Toronto, Ontario (CA)

( * ) Notice: Subject to any disclaimer, the term of this patent is extended or adjusted under 35 U.S.C. 154(b) by 134 days.

(21) Appl. No.: 13/899,741

(22) Filed: May 22, 2013

(65) Prior Publication Data

US 2014/0349688 A1 Nov. 27, 2014

(51) Int. Cl.
*H04W 68/02* (2009.01)
*G08B 5/22* (2006.01)

(52) U.S. Cl.
CPC .............. *H04W 68/02* (2013.01); *G08B 5/223* (2013.01)

(58) Field of Classification Search
USPC .............................................. 455/456.1–458
See application file for complete search history.

(56) References Cited

U.S. PATENT DOCUMENTS

| | | | |
|---|---|---|---|
| 7,149,535 B1 | 12/2006 | Chaturvedi et al. | |
| 8,768,310 B1* | 7/2014 | Oroskar | 455/412.2 |
| 2004/0198385 A1 | 10/2004 | Madine et al. | |
| 2006/0068813 A1* | 3/2006 | Ku et al. | 455/458 |
| 2008/0057955 A1* | 3/2008 | Choi-Grogan | 455/435.1 |
| 2009/0181672 A1* | 7/2009 | Horn et al. | 455/435.1 |
| 2011/0143802 A1* | 6/2011 | Shin et al. | 455/515 |
| 2011/0261715 A1* | 10/2011 | Norefors et al. | 370/252 |
| 2012/0039246 A1 | 2/2012 | Lin et al. | |
| 2012/0115515 A1* | 5/2012 | Lopez et al. | 455/458 |
| 2012/0164970 A1 | 6/2012 | Fomukong et al. | |
| 2012/0195275 A1 | 8/2012 | Bhan et al. | |
| 2012/0244816 A1 | 9/2012 | Yi et al. | |
| 2014/0155109 A1* | 6/2014 | Vaidya et al. | 455/458 |

* cited by examiner

*Primary Examiner* — Daniel Lai
(74) *Attorney, Agent, or Firm* — Rowand LLP

(57) ABSTRACT

Disclosed is a method of paging an electronic device when the electronic device is in an idle state, the method comprising: determining a time; determining a primary tracking area that is associated with a time period in a profile of the electronic device, wherein the time period comprises the determined time; and transmitting a paging message to the electronic device in one or more target tracking area, the one or more target tracking area comprising the primary tracking area.

18 Claims, 4 Drawing Sheets

PAGING AN IDLE STATE ELECTRONIC DEVICE

TECHNICAL FIELD

The present disclosure relates to paging and, more particularly, to paging an idle state electronic device.

BACKGROUND

Paging can be used to communicate with an electronic device when the network (or a network component) is not aware of the location of the electronic device, such as when the electronic device is in an idle state. Paging is commonly performed by broadcasting a paging message to a number of locations. The electronic devices in each location may be configured to assess all incoming paging message. Each such message can use up battery resources on each electronic device as well as network paging channel bandwidth.

BRIEF DESCRIPTION OF THE DRAWINGS

Reference will now be made, by way of example, to the accompanying drawings which show example embodiments of the present application and in which.

Like reference numerals are used in the drawings to denote like elements and components.

DETAILED DESCRIPTION OF EXAMPLE EMBODIMENTS

Figure 1:
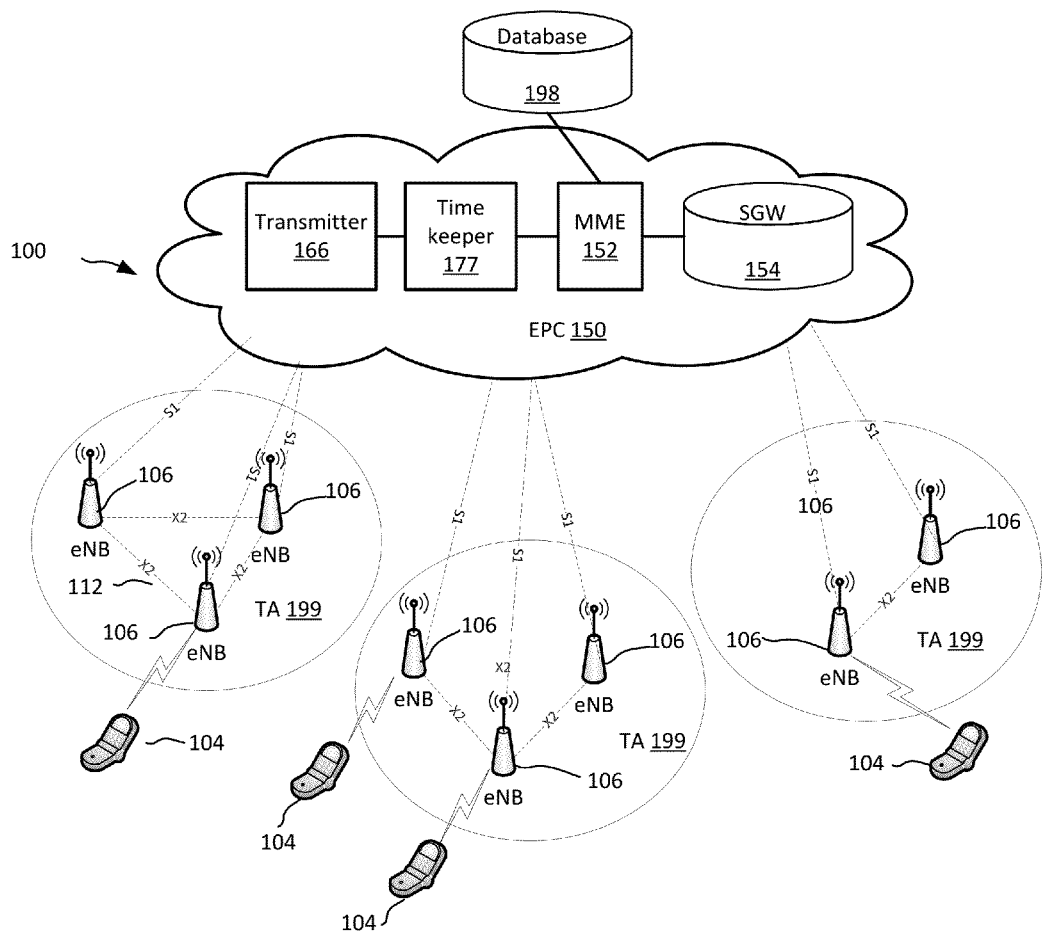
FIG. 1 is a block diagram of an exemplary wireless network in accordance with example embodiments of the present disclosure.

In one aspect, disclosed is a method of paging an electronic device when the electronic device is in an idle state. The method comprises determining a time; determining a primary tracking area that is associated with a time period in a profile of the electronic device, wherein the time period comprises the determined time; and transmitting a paging message to the electronic device in one or more target tracking area, the one or more target tracking area comprising the primary tracking area.

In another aspect, disclosed is a network component for managing the initiation of data transmission to an electronic device when the electronic device is in an idle state. The network component comprises: a database for storing profiles; a time keeper for keeping time; a transmitter; and, a processor connected to the database, the time keeper and the transmitter, the processor configured to: retrieve a time from the time keeper; retrieve the profile of the electronic device; determine a primary tracking area that is associated with a time period in the profile, wherein the time period comprises the retrieved time; and, instruct the transmitter to transmit a paging message to the electronic device in one or more target tracking area, the one or more target tracking area comprising the primary tracking area.

In another aspect, disclosed is a method of paging an electronic device when the electronic device is in an idle state, the method comprising: determining a primary tracking area that is associated with a profile of the electronic device; and, transmitting a paging message to the electronic device in in or more target tracking area, the target tracking area comprising the primary tracking area.

Other example embodiments of the present disclosure will be apparent to those of ordinary skill in the art from a review of the following detailed description in conjunction with the drawings.

Generally, a method of paging an electronic device is described. The method includes determining a tracking area and one or more nodes in that tracking area that the electronic device is most likely to be associated with during one or more time periods during a day. When a paging message is to be transmitted to an electronic device, the network transmits the paging message only to the location that the electronic device is most likely to be in during that time of day. Thus, the paging method reduces the paging area using a profile-based paging schematic. In other words, the paging message targets the locations (e.g. tracking areas and nodes) that are most likely to be used by the electronic device.

A sample of the situations when an electronic device may be paged is the following:
1. when a call (e.g. a phone call) is placed to the electronic device;
2. when the electronic device is in the same tracking area as another electronic device that is receiving a call;
3. when the location of an electronic device is being determined, such as when enforcing calls; or
4. when information or data related to the paging system is being modified.

Exemplary Wireless Network

FIG. 1 is a block diagram of an exemplary wireless network 100. The wireless network 100 may be a subscriber network which is configured to provide subscription-based services to a plurality of electronic devices 104. For example, the wireless network 100 may provide voice communication services to electronic devices 104 operating within a coverage area provided by the wireless network 100. The coverage area may be subdivided into one or more tracking areas 199. That is, the wireless network 100 may allow the electronic device 104 to engage in voice-based communications, such as telephone calls, with other devices such as other smartphones, mobile phone, or landline-based telephones. The wireless network 100 includes one or more network components such as an Evolved Packet Core (EPC) 150. The EPC 150 includes a Mobility Management Entity (MME) 152, a Serving Gateway (SGW) 154, a Packet Data Network Gateway (PGW) as well as underlying internet protocol and transport infrastructure. The MME 152 may also be associated with a transmitter (not shown).

In at least some embodiments, the wireless network 100 may provide data communication services to the electronic devices 104. For example, the wireless network 100 may allow electronic devices 104 to send data to or receive data from other devices or systems such as other electronic devices 104 or servers (or both). For example, the wireless network 100 may, in at least some embodiments, provide access to one or more public or private networks such as the Internet.

The electronic devices 104 that operate within the wireless network 100 may take any one of a number of different forms. By way of example, the electronic devices 104 may include smartphones, tablets, modems, computing devices, smart meters or electronic devices 104 of another type. Electronic devices 104 may also be identified as consumer equipment devices or user equipment.

The exemplary wireless network is a network that is configured to operate according to a 3rd Generation Partnership Project (3GPP) standard. 3GPP is a wireless industry standards organization that develops and maintains wireless network access technologies. In the example shown, the wireless network 100 is a Long Term Evolution ("LTE") network (which may also be referred to as a 4G LTE wireless network 100). It will be appreciated, however, that the wireless network 100 may take other forms in other embodiments.

The exemplary wireless network 100 is an orthogonal frequency division multiplexing (OFDM) based wireless network 100. The OFDM-based wireless network 100 is, in at least some embodiments, an LTE network (which may also be referred to as a 4G LTE wireless network 100). LTE is a standard for wireless communication of high-speed data to electronic (CE) 104.

The wireless network 100 may be allocated and operate over a defined set of frequencies. Typically, a wireless spectrum is divided up into discrete sets of bands and a specific wireless network 100 may only be permitted to operate using a specific band or set of bands. These bands may be LTE bands. That is, the wireless network 100 may utilize band specifications that are a part of the LTE standard. For example, in at least some embodiments, the wireless network 100 may utilize LTE band 7. LTE band 7 is an operating band which is assigned an uplink frequency range of 2500 MHZ to 2570 MHZ and a downlink frequency range of 2620 MHZ to 2690 MHZ. In some embodiments, the wireless network 100 may utilize LTE band 20. LTE band 20 is an operating band which is assigned an uplink frequency range of 832 MHZ to 862 MHZ and a downlink frequency range 791 MHZ to 821 MHZ. By way of further example, in some embodiments, the wireless network 100 may utilize LTE band 17, which is assigned an uplink frequency range of 704 MHZ to 716 MHZ and a downlink frequency range of 734 MHZ to 746 MHZ. By way of further example, in some embodiments, the wireless network may utilize LTE band 4, which is assigned an uplink frequency range of 1710 to 1755 MHz and a downlink frequency range of 2110 to 2155 MHz. It will be appreciated that the specific sets of bands that are mentioned above (LTE bands 7, 17 and 20) are not an exhaustive list of the bands which may be utilized by the wireless network 100 and that the wireless network 100 may utilize other bands apart from those specifically listed.

In at least some embodiments, the wireless network may be allocated spectrum associated with a plurality of LTE bands.

The architecture of the exemplary wireless network may be a System Architecture Evolution (SAE)-based architecture. An SAE-based architecture is one that uses the core network architecture of the 3GPP LTE wireless communication standard.

The wireless network 100 includes a radio access network. For example, the wireless network 100 can operate using an interface such as an Evolved Universal Mobile Telecommunications System (UMTS) Terrestrial Radio Access Network, which may be abbreviated as E-UTRAN.

As illustrated, the wireless network 100 includes a plurality of nodes 106 within the radio access network. These nodes 106 are, in at least some embodiments, Evolved Node B nodes 106, which may also be referred to as Evolved Universal Terrestrial Radio Access (e-UTRAN) Node B nodes 106. Evolved Node B is sometimes abbreviated as eNodeB or eNB and is referred to as eNB in the exemplary wireless network 100 of FIG. 1. The nodes 106 are hardware components which are connected with the network that communicate with the electronic devices 104. The nodes 106 may also be referred to as access points or base stations.

The nodes 106 can be categorized into one or more tracking areas (TAs) 199. Each TA 199 can include one or more nodes 106. The TAs 199 can be geographically organized so that nodes 106 in the same TA 199 are in closer proximity than nodes 106 in other TAs 199. For example, the TAs 199 can be configured in a topology that can be used to geographically organize the nodes 106. The topology (or a representation of the topology that identifies the TAs 199) can be stored in memory associated with the MME 152. For example, each TA 199 may be stored in the memory as a list of one or more nodes 106.

The wireless network 100 includes multiple nodes 106. In the example illustrated, three eNodeB nodes are shown in two of the TAs 199 and two eNodeB nodes are shown in the third TA 199. In practice the number of nodes 106 in a TA 199 and the number of TAs 199 may be much greater (or less). The nodes 106 may be configured to broadcast or transmit radio signals within specific coverage areas. The number of nodes that are required will depend on the coverage area of the wireless network 100, the number of electronic devices 104 operating in the wireless network 100 and the quantity of bandwidth expected to be consumed by such electronic devices 104. The nodes 106 may have differing coverage areas (or vicinities or ranges) so that when an electronic device 104 is located at a given location, it may communicate with one of the nodes 106 but may be outside of the coverage area of at least one other of the nodes 106.

The nodes 106 in each TA 199 can be communicably connected to one another. In the example illustrated, an X2 interface 112 exists between the nodes 106 within each TA 199. This interface 112 can be a direct communication link between the nodes 106. This interface 112 may be used to handle control plane and user plane traffic. For example, it may be used during handover (e.g. as the electronic device 104 travels from an area in which it communicates with one node 106 to an area where it communicates with a different node 106). In one or more embodiments, there may be a direct communication link (or an interface) between nodes in separate TAs 199.

The wireless network 100 includes other components which may, for example, facilitate communications with the Internet or with telephones connected to a public switched telephone network. In the example illustrated, the nodes 106 are connected to the EPC 150 which may also be referred to as a System Architecture Evolution (SAE) core. For example, the nodes 106 may be communicably connected to the EPC 150 through an s1 interface. The s1 interface may be a direct link between the nodes 106 and the EPC 150. The EPC 150 includes the MME 152. The MME 152 is a control node for the wireless network 100. In at least some embodiments, the MME 152 is responsible for tracking electronic devices 104. The MME 152 may also, in at least some embodiments, authenticate electronic devices 104. The MME 152 may provide other functions apart from those discussed herein. For example, the MME 152 may be responsible for sending or transmitting paging messages (e.g. to one or more nodes 106 destined for an electronic device 104). In the illustrated embodiment, the MME 152 is associated with a transmitter 166 and may control the transmitter 166. The transmitter 166 can be a component that is responsible for transmitting data to one or more nodes 106. In one or more embodiments, there may not be a separate transmitter 166 and instead the operation of transmitting data to one or more nodes 106 may be performed by another network component such as the MME 152.

The MME 152 may also be associated with a time keeper 177. The time keeper 177 may be a clock or other time-keeping mechanism or time-keeping component. The time may be retrieved from an external source by the MME 152 or by the time keeper 177. The MME 152 may be configured to receive the time from the time keeper 177. Or, the MME 152 may be configured to retrieve the time from the time keeper 177. The time maintained at the time keeper 177 may consist of a date, year, hour, minute, day of the week, etc. In one or more embodiments, the time keeper 177 may not be a separate component and instead, the function or operation of the time keeper 177 may be performed by the MME 152 or by another network component.

A database 198 may be associated with the MME 152. For example, the MME 152 may be configured to store data to or retrieve data from the database 198. Topology data or topology information, such as the identification and location of one or more nodes 106 and TAs can be stored in the database 198. The profile data or profile information for one or more of the electronic devices 104 can be stored in the database 198. The MME 152 may also be associated with or may contain a processor and a memory.

The EPC 150 also includes one or more gateways. In the example illustrated, the SGW 154 is illustrated. The SGW 154 may, among other things, forward and route user data packets. While not specifically illustrated, the EPC 150 may also include a Packet Data Network Gateway (PGW or PDNGW). The PGW provides connectivity from the electronic devices 104 to external packet networks and acts as a point of exit and entry of traffic for the electronic devices 104. For example, the PGW may connect to the Internet and may provide the electronic devices 104 with access to the Internet. In one or more embodiments, the function or operation of the transmitter 166 may be performed by the SGW 154 or another gateway.

The EPC 150 is connected to the radio access network. More particularly, the nodes 106 are connected to the EPC 150. Thus, the nodes 106 act as access points which provide radio access to the electronic devices 104 within range of the respective node 106 and the EPC 150 is engaged for various tasks such as management and communication-related tasks.

Exemplary Electronic Device

Figure 2:
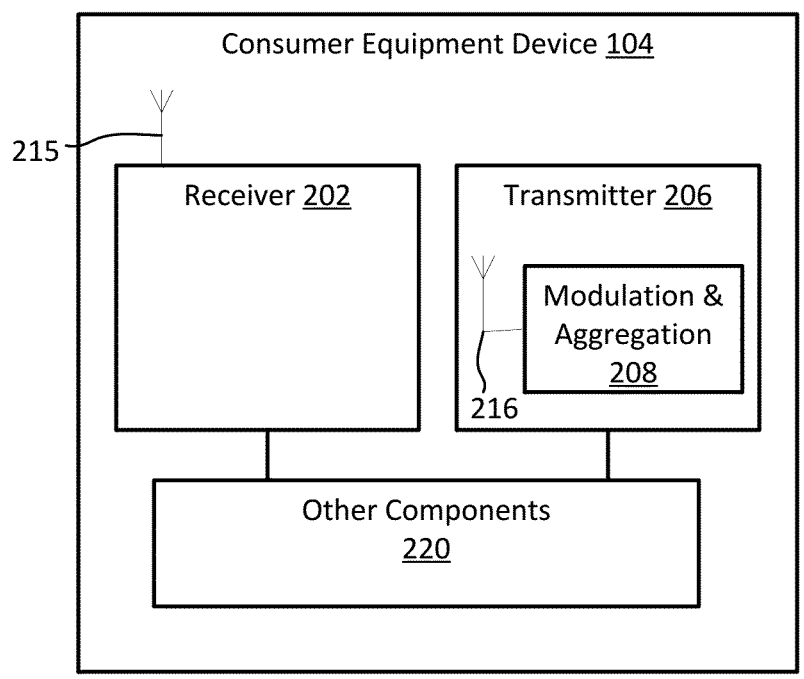
FIG. 2 is a block diagram of an exemplary electronic device in accordance with example embodiments of the present disclosure.

Referring now to FIG. 2, an exemplary electronic device 104 is illustrated in block form. The electronic device 104 illustrated in FIG. 2 shows some components that may be included in the electronic device 104. It will, however, be appreciated that the electronic device 104 can include other components 220 apart from those specifically discussed herein. For example, as is known, the electronic device 104 may include input and output components such as, for example, a display, a keyboard or keypad, a touchscreen, a speaker, etc.

The electronic device 104 is configured to provide upstream communications to the wireless network 100. More particularly, a transmitter 206 includes a modulation component 208 that is configured to prepare a signal for upstream transmission over a transmitter antenna 216. The modulation component 208 may be configured to perform modulation. The transmitter 206 is configured to use resources in accordance with those assigned by a node 106. For example, a scheduler associated with the node 106 may provide the transmitter 206 with access to radio resources, such as specific carriers during specific times, and the transmitter 206 may utilize such resources accordingly.

The electronic device 104 also includes a receiver 202 which is associated with a receiver antenna 215. It will be appreciated that, while the transmitter antenna 216 and the receiver antenna 215 are illustrated as separate components, in at least some embodiments, a common antenna may be used.

An electronic device 104 may register with one or more tracking areas 199. For example, the electronic device 104 may transmit a registration message to a network component when entering a tracking area 199. Or, the electronic device 104 may periodically transmit registration messages to a network component identifying the tracking area 199 in which the electronic device 104 resides. The registration messages may include identification information identifying the electronic device 104 and the tracking area 199 from which the message was sent or received. Each time a registration message is received at a network component, the network component may store the registration information in memory (or in the database 199, for example). The network component may maintain a list of registered TAs 199 for each electronic device 104, for example. The list of registered TAs 199 can include all of the TAs 199 that the electronic device 104 transmitted a registration message from within a previous (predetermined) amount of time. Similarly, the electronic device 104 can register with one or more nodes 106 within a TA 199. The registrations (e.g. the identification of the TAs 199 and nodes 106) can be stored in the profile for the electronic device 104.

Profiles of Electronic Devices

The database 198 can be used to store profiles of electronic devices 104, profiles associated with electronic devices 104 or authentication data associated with electronic devices 104. The database 198 may be connected to the MME 152 so that the MME 152 can have access to the stored profiles. The MME 152 may be configured to access the information or data stored in the database 198 including the electronic device's 104 profile. The profiles can comprise data stored in the database 198. Each profile may be associated with a single electronic device 104. A profile may be created for each electronic device 104. Each electronic device 104 may identify itself (e.g. authenticate, register or provision itself) with the MME 152 (or with a related service or component) in order to receive paging messages or in order to receive transmissions across the network 100.

The profile information (or "mobility information" as it may also be referred as) stored in the profile in the database 198 may include ownership information, usage data, a list of TAs 199 for which the electronic device 104 is registered, services or features, billing information, and other information or data related to the electronic device 104 or its use.

Some of the profile information may be provided by a user upon registration of the electronic device 104 or on a location update of the electronic device 104. The location update can be obtained by a network component from a registration message, for example. Profile information that can be provided by a user upon registration of the electronic device 104 can include, for example, a list of the TAs 199 or nodes 106 that the electronic device 104 may be registered with. In one or more embodiments, some of the profile information may be provided by a user or an operator upon provisioning the electronic device 104 (or upon initiating an account with a network service, for example). For example, a user's contact information and billing information may be stored in (or provisioned in) the database 199. Some of the profile information may be automatically transmitted from the electronic device 104 to the MME 152, such as authentication credentials for the MME 152 or the electronic device 104 or both. In one or more alternative embodiments, the list of the TAs 199 that the electronic device 104 is associated with or registered with may be determined by the MME 152.

Other data or information may be stored in a profile for an electronic device 104 such as authentication and ciphering keys or other user features.

In one or more embodiments, usage data may include the amount of time within a predefined period of time that the electronic device 104 was used while within one or more of the TAs 199. For example, the usage data may include the amount of data that was transmitted between the electronic device 104 and each node 106 with which the electronic device 104 is registered (or each node 106 in a TA 199 that the electronic device 104 is registered with). An electronic device 104 may be considered to be used within a TA 199 during the time that a communication channel is established between the electronic device 104 over the network 100 using one or more nodes 106 in the TA 199. The usage data may consist of the number of established connections made involving the electronic device 104 in each TA 199 or it may consist of the amount of data transmitted across an established connection, for example.

In one or more embodiments, the profile may also include one or more time periods. A time period may be a certain segment of a day (e.g. 9 am to 5 pm), a certain time during specific days (e.g. 9 am to 5 pm on weekdays), certain days (e.g. Saturdays), or certain holidays for example. The profile may also contain or maintain one or more associations of one or more TAs 199 or one or more nodes 106 with one or more time periods.

For example, the profile may designate one TA 199 with a specific time period based on the fact that the TA 199 is the most used TA 199 during that time period. The profile may also identify one or more nodes 106 that are within that TA 199 as being the most used node(s) 106 within that TA 199 during the time period. The TA 199 may be designated or labelled as the primary tracking area and the nodes 106 may be designated or labelled as the primary nodes 106 within the profile. Similarly, there may be another TA 199 that is designated as the secondary tracking area for that time period, which may also have one or more most used node(s) 106 within it that may be designated as secondary nodes within the profile. The secondary tracking area may be the second most used TA 199 within the time period.

In one or more embodiments, there profile may store an alternative-time tracking area. For example, the alternative-time tracking area can comprise one or more TAs 199. The profile may store an association of an alternative time period with the alternative-time tracking area. For example, the alternative time period may be different from the time period (i.e. different from the time period with which the primary tracking area is associated). The alternative-time tracking area can be the TA 199 that is the most used TA 199 by the electronic device within the alternative time period. The alternative time period can be a pre-defined time period.

In one or more embodiments, the profiles are dynamically updated. For example, the alternative-time tracking area and the primary tracking area can be dynamically determined based on a rolling history of usage data. Alternatively, or additionally, the alternative-time tracking area or the primary tracking area (or both) can be provisioned by the electronic device 104 (or a user) or at a network component.

In one or more embodiments, the primary tracking area can be a work location and the alternative-time tracking area can be a residential location.

In one or more embodiments, the first time period may include one or more dates or the time period may include restrictions on dates. For example, the time period may include every Monday to Friday from 9 am to 5 pm. In a further example, the time period may include 9 am to 5 pm except for Saturdays, Sundays and Holidays. Similarly, the alternative time period may include one or more dates or restrictions on dates.

In one or more embodiments, there may be a plurality of time periods (including the first time period and second time period) that are each associated with one or more times of day in the profile of the electronic device 104. Each of, or a plurality of, electronic devices 104 may have profiles stored in the database 198. For example, there may be a third time period associated with a third pair of tracking areas and a fourth time period associated with a fourth pair of tracking areas. The third pair of tracking areas may comprise another primary tracking area and another secondary tracking area. Similarly, the fourth pair of tracking areas may comprise yet another primary tracking area and yet another secondary tracking area.

The primary tracking area and/or the secondary tracking area and/or the time period may be predetermined based on a known location related to the electronic device 104. For example, the primary tracking area or the secondary tracking area (or both) may be determined during registration of the electronic device 104 with the network 100 (or MME 152) or registration with an enterprise. For example, the primary tracking area may be one which includes a residential location or residential address which may be determined upon device registration or which may be otherwise provided to the network. In another example, the primary tracking area may be one which includes a work location or work address. Similarly, the time period may be business hours (e.g. 9 am to 5 pm on weekdays) so that the primary tracking includes a work address and the time period is business hours. In the same example, the alternative-time tracking area may include an alternative work address. By way of further example, the primary tracking area and/or the time period may be manually provided to the MME 152 (e.g. through an interface on the electronic device 104). Similarly, the respective primary tracking area or secondary tracking area (or both) of the secondary, third or fourth (or other) time periods may be manually provided to the MME 152. For example, the electronic device 104 may provide a prompt for entering a most used location and/or a time of use for a most used location.

In one or more embodiments, the primary tracking area and the secondary tracking area of the time period can be determined based on usage data of the electronic device. For example, the MME 152 (or another component in the network 100 such as a processor associated with the MME 152) may collect data associated with the usage of the electronic device 104. The data may be collected during a predefined period of time. The predefined period of time can be a previous number of days or months, such as the previous 6 months. Alternatively, the predefined period of time can be any selected time period (e.g. days or months) regardless of when the time period occurred. For example, the predefined period of time can be during the first 6 months after the device is initially used. By way of further example, the predefined time period can be the first month of the most previous calendar year.

After the data is collected during the predefined time period, the profile may be updated based on the collected data. Additional data associated with the electronic device 104 can then be collected to update, renew or create a new profile. The additional data can be collected during another predefined time period (e.g. the previous 6 months or the previous rolling 6 months), for example. The data collection may include tabulating the number of established connections made between the electronic device 104 and node(s) 106 in each TA 199 that the electronic device 104 is registered with. The tabulation of established connections may also include the time (e.g. date, hour, etc.) when the connection was established. In one or more embodiments, the profile stored in the database 198 categorizes the collected data. For example, the profile may be configured with predetermined time periods within which the tabulated established connections are to be associated with. Such predetermined time periods may include weekday business hours, holidays, weekends, night time, etc. As a result, the profile may include an association each of the predetermined time periods with one or more nodes 106 in the respective primary and secondary TA 199 which may include the TA 199 and the nodes 106 in which the electronic device 104 established the most connections with during the predetermined time period.

For example, the profile may associate each time period with a primary TA 199 (with one or more node 106) and a secondary TA 199 (with one or more node 106)

In one or more alternative embodiments, the time periods in the profile for each electronic device 104 stored in the database 198 may be dynamically evaluated. For example, a time of day, which may include the time and date, and the TA 199 and node(s) 106 associated with each established connection for the electronic device 104 may be dynamically categorized. The MME 152 (or another component associated with the MME 152) may dynamically determine the time periods within which to categorize the TAs 199 that the electronic device 104 most likely resides in.

The usage data collected during the predefined time period may include identifying and counting (or tabulating) the TA(s) 199 that the electronic device 104 was associated with (or registered with) during the time when a communication channel (other than the paging channel) was established with the electronic device 104 over the network; the amount of time the communication channel was established during each session (a session may be the when the communication channel was active or when data was being transmitted across the communication channel); the time of day during when each communication channel was established; etc.

In one or more embodiment, the usage data may be analyzed to determine the TA 199 and one or more associated nodes 106 that were the most used during the first time period for the electronic device 104 within the predefined period of time. This most used TA 199 may be identified as the primary tracking area. Similarly, the usage data may be analyzed to determine the TA 199 and one or more associated nodes 106 that were the second-most used during the first time period for the electronic device 104 within the predefined period of time. This second-most used TA 199 may be identified as the secondary tracking area.

The usage data may also be analyzed to determine a time when the most used TA 199 and the second-most used TA 199 were used (e.g. the time period). For example, the time may be from a selection of times of day that are predefined by the MME 152 (or by another component associated with the MME 152).

In one or more alternative embodiments, a time period may be predetermined and may be allocated or associated with the TA 199 that was most commonly used during the first time period (as determined based on the usage data from the predetermined period of time). Similarly, a second time period may be predetermined and may be allocated or associated with the TA 199 that was most commonly used during the second time period (as determined based on the usage data from the predetermined period of time).

The most used TA 199 (or primary tracking area) for the electronic device 104 can be the TA 199 from which the electronic device 104 placed the most phone calls within the (predetermined) time period. Alternatively, the most used TA 199 for the electronic device 104 can be the TA 199 from which the electronic device 104 transmitted the most data or in which the electronic device 104 received the most data. Similarly, the secondary tracking area may be the TA 199 may be the second most used TA 199 by the electronic device 104.

In accordance with one or more embodiments, the time of day may be divided up into categories in the profile of an electronic device 104. The number of established connections that the electronic device 104 makes during each time category may then be counted during the predefined time period. The TA 199 that has the most number of established connections in a time period may be considered to be the primary tracking area for that time period. Similarly, the TA 199 that has the second most number of established connections in a time period is the secondary tracking area for that time period. Thus, there may be a primary tracking area and a secondary tracking area for each time period. Following this procedure there may be third, fourth, fifth, etc. time periods each with associated primary tracking areas and secondary tracking areas.

In one or more embodiments, the profile for an electronic device 104 includes an association of a specific TA 199 and its associated one or more nodes 106 with a specific day. For example, the determined time of day or the present time of day may be identified as a specific date (e.g. Jan. 1, 2013). By way of further example, the specific tracking area 199 and specific day may be predetermined, such as a holiday and a holiday-related location. Accordingly, the profile may associate a specific TA 199 with a known holiday when the electronic device 104 is expected to be in the specific TA 199 (e.g. one that includes a residential location). If the determined time is in that specific date (e.g. the current time is in the holiday) then the primary tracking area is the one that is associated with that specific date.

LTE Paging Process

In accordance with an embodiment, an electronic device 104 may be in either a connected state or an idle state. In a connected or active state a communication channel has already been established between the electronic device 104 and the MME 152 (e.g. through a node 106) in order to transmit and receive data across the network 100. Accordingly, in the connected or active state the MME 152 knows the location of the electronic device 104. In other words the MME 152 knows the node(s) 106 or TA(s) 199 through which the electronic device 104 is transmitting data (such as voice or video data). For example, the MME 152 may store or have access to data in a memory that identifies the location of the electronic device (or the closest TA 199 or node 106 to the electronic device 104) when the electronic device 104 is in an active or connected state. In an idle state no communication channel has been established between the electronic device 104 and the MME 152 for receiving and transmitting data. To transmit data to the electronic device 104 when the electronic device 104 is in an idle state the MME 152 first sends a paging message to the electronic device 104 in order to locate and activate the electronic device 104. The paging message can be used to locate the electronic device 104. For example, when the MME 152 (or an associated network component) does not know the location of the electronic device 104 and wishes to communicate with (or transmit data across the network to) the electronic device 104, the MME 152 can broadcast a paging message to all the nodes 106 in all of the TAs 199 that the electronic device 104 is registered with in order to locate the electronic device 104. The MME 152 is generally responsible for transmitting paging messages to nodes 106, and the nodes 106 then broadcast the paging messages to all electronic devices 104 within each node's 106 respective territory or respective coverage area.

In another embodiment, when the MME 152 receives a downlink data notification message from the Serving Gateway 154, the MME 152 sends a paging message to all nodes 106 in the TA 199 list. In other words, the MME 152 sends a paging message to all nodes 106 in the TAs 199 with which the electronic device 104 is registered. For example, the TAs 199 registered in association with the electronic device 104 can be stored in a list in memory (e.g. in the profile).

The MME 152 can transmit paging messages to the nodes 106 on a dedicated frequency, which may be called a paging channel. For example, to send a paging message to a node 106, the MME 152 can transmit the paging message on the paging channel. In another embodiment, the MME 152 can transmit paging messages to the nodes 106 along physical links or wires.

Data, such as a paging message, may be modulated on the paging channel. When the paging message arrives at a node 106 it is transmitted over the air interface using resources on the Physical Downlink Control Channel (PDCCH) and the Physical Downlink Shared Channel (PDSCH). The paging channel may also be identified as the PCCH. The PCCH may also be used to transmit data other than paging messages to electronic devices 104.

The electronic device 104 can be configured to monitor the paging channel in order to determine whether a paging message is being transmitted on the paging channel. In one or more embodiment the electronic device 104 may determine that there is a message on the paging channel. The electronic device 104 may then demodulate the message to determine whether it is a paging message.

In one or more embodiments, the electronic device 104 monitors the paging channel at regular intervals to check for the presence of a message. For example, the electronic device 104 may use discontinuous reception (DRX). According to the DRX procedure, the electronic device 104 monitors the paging channel at regular intervals. The MME 152 and/or nodes 106 can transmit the paging messages during one or more of the same intervals. In one or more embodiments, the interval is 2.56 seconds. The electronic device 104 may go into a sleep state when the network 100 is not transmitting on the paging channel and when the electronic device 104 is otherwise in an idle state. According to the DRX procedure, the electronic device 104 will wake up for a brief period at the time the eNode (or node 106) is expected to transmit paging messages.

A paging message can include an identification of the electronic device 104 that is being paged. A paging message can also include information that describes the times when the electronic device 104 may be listening for broadcast paging messages. The node(s) 106 that receive the paging message can then transmit (or broadcast) the paging messages at times (or time intervals) that correspond to those identified in the paging message.

After it is determined that the electronic device 104 is idle, the MME 152 may initiate the paging procedure. The MME 152 initiates the paging procedure by sending a paging message to all of the nodes 106 in all of the TAs 199 that the electronic device 104 is registered with. The paging message can be sent on the paging channel. As noted, the electronic device 104 can be registered with multiple TAs 199. For example, the MME 152 can determine the TAs 199 that the electronic device 104 is registered with by accessing the profile for that electronic device. After receiving the paging message, each node 106 then transmits the paging message to all the electronic devices 104 in its coverage. Note that the transmission of data from the node 106 to the electronic device may be done in accordance with the DRX.

In one or more embodiments, as described in more detail below, paging message may be transmitted to one or more selected node(s) 106 in one or more selected TA 199 instead of all of the nodes 106 in all of the TAs 199 that the electronic device 104 is registered with.

Exemplary Method of Initiating Transmission of Data

Figure 3:
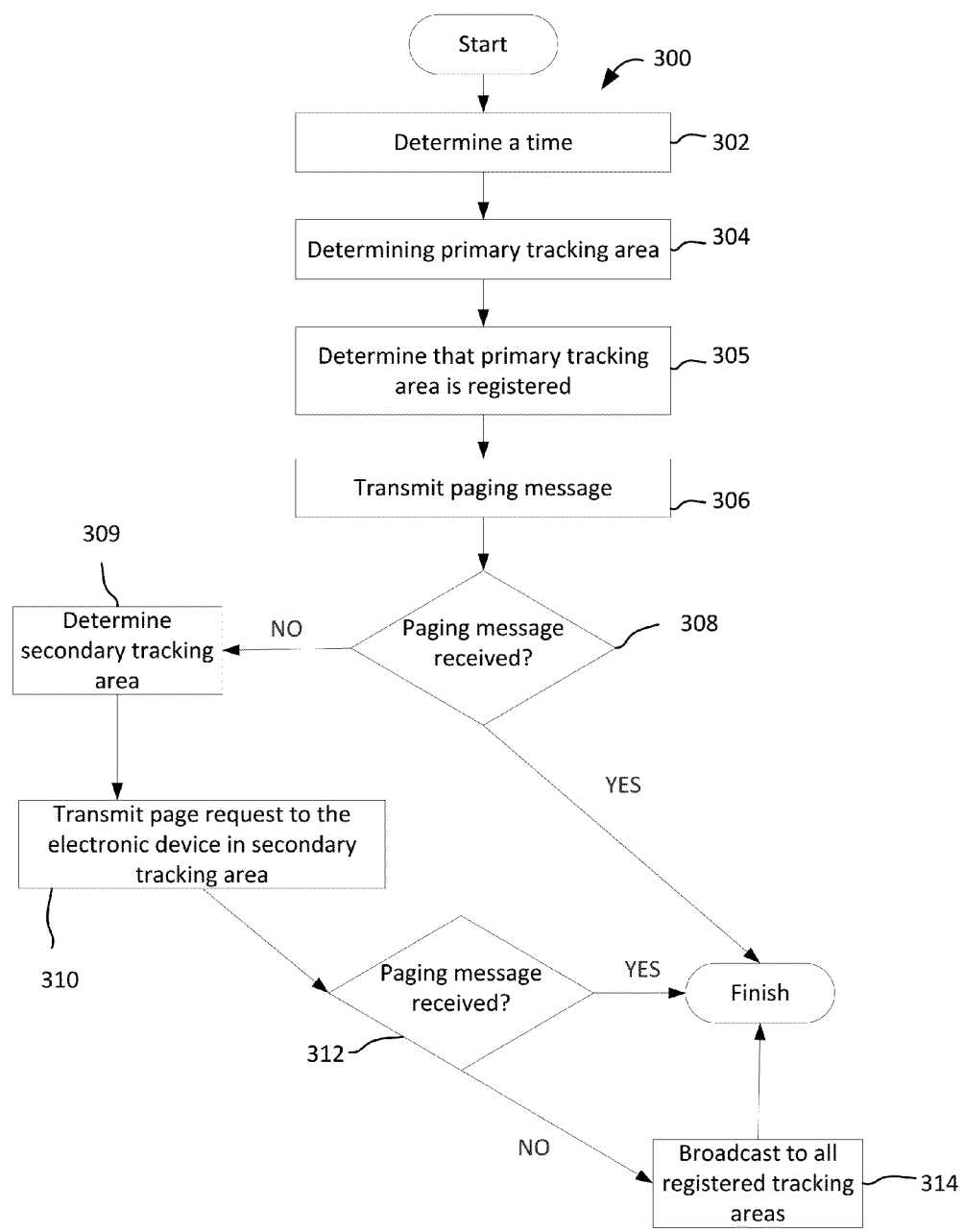
FIG. 3 is a flowchart illustrating a method of paging an electronic device when the electronic device is in an idle state; and, FIG. 4 is a flowchart illustrating a method of paging an electronic device when the electronic device is in an idle state.

FIG. 3 illustrates an exemplary method 300 of paging an electronic device 104 when the electronic device is in an idle state. The method may be carried out or implemented using a processor that is connected to the database 198. The processor may be associated with the MME 152, or the method may be implemented at the MME 152. In one or more embodiments, a network component (such as the MME 152) may include a processor that implements the method 300.

At 302, a time is determined. For example, there may be a time keeper (e.g. a clock) associated with the MME 152, such as time keeper 177. The MME 152 may be able to obtain a present time (e.g. a time of day) from the time keeper 177. The present time can include one or more of a year, a date, a specific date, a specific day of the week, or a specific time during the day, for example.

At 304, a primary tracking area that is associated with a time period that comprises the time of day is determined based on a profile of the electronic device 104. For example, the MME 152 may access the electronic device's 104 profile from the database 198. From that profile, the MME 152 can determine the primary tracking area. The primary tracking area may be associated in the profile with a time period, which may also be determined by the MME 152. By way of further example, the time period may contain the determined time. In other words, the present time of day may be within a period of time that is associated with the primary tracking area. The time period associated with the primary tracking area may be a time period during each day (e.g. 9 am to 5 pm), a time period during specific days (e.g. 9 am to 5 pm on weekdays), or specific days (e.g. holidays) for example.

At 305, it is determined that the primary tracking area is identified as registered with the electronic device 104. For example, the MME 152 may compare the primary tracking area with the TAs 199 that are presently registered in association with the electronic device 104. In one or more embodiments, the electronic device 104 may periodically transmit messages to the MME 152 (or to another network component) that identify the electronic device 104 and from which the MME 152 can determine the TA 199 where the message was received. The TA 199 from where the message was received may then be associated with the electronic device 104 in a memory associated with the MME 152 or the database 198. If the electronic device 104 moves to another TA 199 and sends a message from that TA 199, this other TA 199 may also be associated with the electronic device 104. Following such a procedure, multiple TAs 199 may be associated with the electronic device 104. The messages may be sent from an electronic device 104 after pre-defined time intervals. Different electronic device 104 may have different such pre-defined time intervals.

The TAs 199 that are associated with the electronic device may be said to be "registered" with the electronic device 104. In one or more embodiments, individual nodes 106 rather than (or in addition to) tracking areas 199 may be registered with the electronic device 104. A network component (such as the MME 152) may maintain a historical record of the TAs 199 and nodes 106 that each electronic device 104 is or was registered with. The list of registered TAs 199 for an electronic device 104 may be stored in the profile of that electronic device 104. The association of a TA 199 (or node 106) may be removed from the profile of an electronic device 104 after a set period of time, for example. In another example, the association of a TA 199 (or node 106) may be removed from the profile of an electronic device 104 if no message has been received at that TA 199 (or node 106) after a predefined period of time.

In one or more embodiments, one or more primary nodes in the primary tracking area may be determined. The primary nodes may be associated with the time period in the profile of the electronic device 104. The primary nodes are nodes 106 within the primary tracking area that are designated as "primary" by the MME 152 or another network component. A node 106 may be designated as primary based on historical data, user input or network input (or provisioning), for example. Nodes 106 designated as primary nodes for a particular electronic device 104 may be identified as primary nodes in that electronic device's 104 profile.

In one or more embodiments, a node 106 may be designated as primary based on how often the electronic device 104 transmitted data, such as messages or phone calls, using the node 106. For example, the volume of calls involving the electronic device 104 that use the node 106 may be compared to the volume of calls involving the electronic device 104 that use other nodes 106 (such as the other nodes 106 that are registered with the electronic device 104. The one or more most common nodes 106 during the time period may be designated as primary nodes.

At 306 a paging message is transmitted to the electronic device 104 in the primary tracking area. For example, the paging message may be transmitted to the electronic device 104 only in the primary tracking area. Or, the paging message may be transmitted to the electronic device 104 in one or more tracking areas which includes the primary tracking area. Or, in an alternative embodiment, the paging message may be transmitted to all TAs 199 registered with the electronic device 104 (including the primary tracking area) except those identified on a blacklist (which itself may be predefined).

In one or more embodiments transmitting the paging message to the electronic device 104 in the primary tracking area includes transmitting the paging message to the primary nodes within the primary tracking area. The primary nodes may include nodes 106 that are associated with the electronic device 104 in the profile. For example, the paging message can be transmitted from the MME 152 to the primary node(s) 106 in the primary tracking area. The nodes 106 can then transmit or relay the paging message to all electronic devices 104 within its coverage on the paging channel. The electronic device 104 can periodically check the paging channel in accordance with the DRX procedure in order to receive the paging message.

At 308, it is determined whether the paging message is received at the electronic device 104 in the primary tracking area. For example, the electronic device 104 may transmit a message to the network or MME 152 (or another network component) indicating that the paging message was received at the electronic device 104. The messages transmitted between the MME 152 and the electronic device 104 may be through a node 106 (i.e. a primary node) in the primary tracking area.

If the paging message was received at the electronic device 104, the method can be finished. For example, a radio connection can be established between the electronic device 104 and the MME 152.

If the paging message was not received at the electronic device 104 in the primary tracking area, then a secondary tracking area may be determined (at 309). For example, it may be determined that the secondary tracking area is identified as registered with the electronic device 104. In another embodiment, the secondary tracking area may have been previously determined (e.g. at 304 and/or 305 along with determining the primary tracking area). The network component (or the MME 152, for example) may be able to determine that the paging message was not received if no confirmation message has been received from the electronic device 104 within a set amount of time. Determining the secondary tracking area can include retrieving the identity (or location) of the secondary tracking area from the profile of the electronic device 104.

The secondary tracking area may be determined from the profile associated with the electronic device 104. For example, the MME 152 may retrieve the profile from a memory or the database 198 and determine from the profile the identity of the secondary tracking area.

In one or more embodiments, the MME 152 (or another network component) may determine one or more nodes 106 in the secondary tracking area that may be identified as secondary nodes. The secondary nodes may be nodes 106 that the MME 152 deems the electronic device 104 to be most likely near to. The secondary nodes can be determined based on historical usage data or may have been previously provisioned (or provided by) a user of the electronic device 104 or an administrator through a network component.

At 310, the paging message may be transmitted to the electronic device 104 in the secondary tracking area. For example, the paging message can be transmitted to the node(s) 106 in the secondary tracking area. The node(s) 106 in the secondary tracking area may then forward or transmit the paging message to all the electronic devices 104 within range of the respective node 106. By way of further example, the paging message can be transmitted to the secondary nodes in the secondary tracking area, and the secondary nodes may then transmit the paging message to all the electric devices 104 within range of each respective secondary node.

At 312, it is determined whether the paging message was received at the electronic device 104. For example, the electronic device 104 may transmit a confirmation message back to the MME 152 (or a related network component) indicating that the electronic device 104 received the paging message. The electronic device 104 may be configured to transmit a confirmation message back to the MME 152 a predetermined amount of time after receiving the paging message. Accordingly, if the MME 152 does not receive the confirmation message within the predetermined amount of time, the MME 152 may determine that the paging message was not received at the electronic device 104. If it is determined that the paging message was received, then the method 300 can be completed.

If it is determined that the paging message was not received at the electronic device 104 through the secondary tracking area (and the secondary nodes), then (at 314) the paging message may be broadcast to all tracking areas that are registered with the electronic device 104. For example, the paging message may be broadcast to all nodes 106 in all tracking areas that are registered with the electronic device 104.

There may be additional tracking areas (e.g. third tracking area, fourth tracking area, etc.) that associated with the time period which may be targeted with the paging message for the electronic device 104 after it is determined that the paging message was not received at the electronic device 104 through the secondary tracking area. The additional tracking areas are tracking areas that are (or were) registered with the electronic device 104.

In one or more embodiments, at 314 the paging message is broadcast to all nodes 106 in the primary tracking area. The paging message may also be broadcast to all nodes 106 in the secondary tracking area. It may then be determined whether the paging message was received at the electronic device 104. If the paging message was not received at the electronic device 104 (e.g. if no confirmation message was received from the electronic device 104) then the MME 152 (or another network component) may then transmit the paging message to all nodes 106 in all TAs 199 that are registered with the electronic device 104.

Broadcasting the paging message to all nodes in the primary tracking area may be performed after step 308 when it is determined that the paging message was not received at the electronic device after transmitting the paging message to the primary nodes in the primary tracking area. Similarly, broadcasting the paging message to all nodes in the secondary tracking area may be performed after step 312 when it is determined that the paging message was not received at the electronic device after transmitting the paging message to the secondary nodes in the secondary tracking area.

After a paging message is received at the electronic device 104, a radio connection may be established between the node 106 and the electronic device 104. For example, after the paging message is received at the electronic device 104, the electronic device 104 may transmit a service request to the MME 152 thereby initiating a radio connection between the MME 152 (through the node 106) and the electronic device 104.

In one or more additional embodiments, after transmitting the paging message to the secondary tracking area (at 310), it is determined that the paging message was not received at the electronic device 104 in the secondary tracking area. The paging message may then be broadcast. For example, the paging message may be broadcast to all TAs 199 (and all nodes 106 in those TAs 199) that the electronic device 104 is registered with. The determination that the paging message was not received at the electronic device 104 may be based on the lack of response or transmission from the electronic device 104 within a predefined time-period. Or the determination that the paging message was not received at the electronic device 104 may be based on the fact that no communication channel is established with the electronic device 104 in the secondary tracking area within a predetermined amount of time.

It may be determined, at 302 that the time is within the alternative time period (as defined in the profile of the electronic device 104). In such a situation, the alternative-time tracking area 304 (and one or more alternative node(s) 106) may be determined at 304. After determining (at 305) that the alternative-time tracking area is registered with the electronic device 104, the paging message may be transmitted to the electronic device 306. The method 300 may then be completed or it may follow the steps 308 to 314, using an alternative-time secondary tracking area for example.

Figure 4:
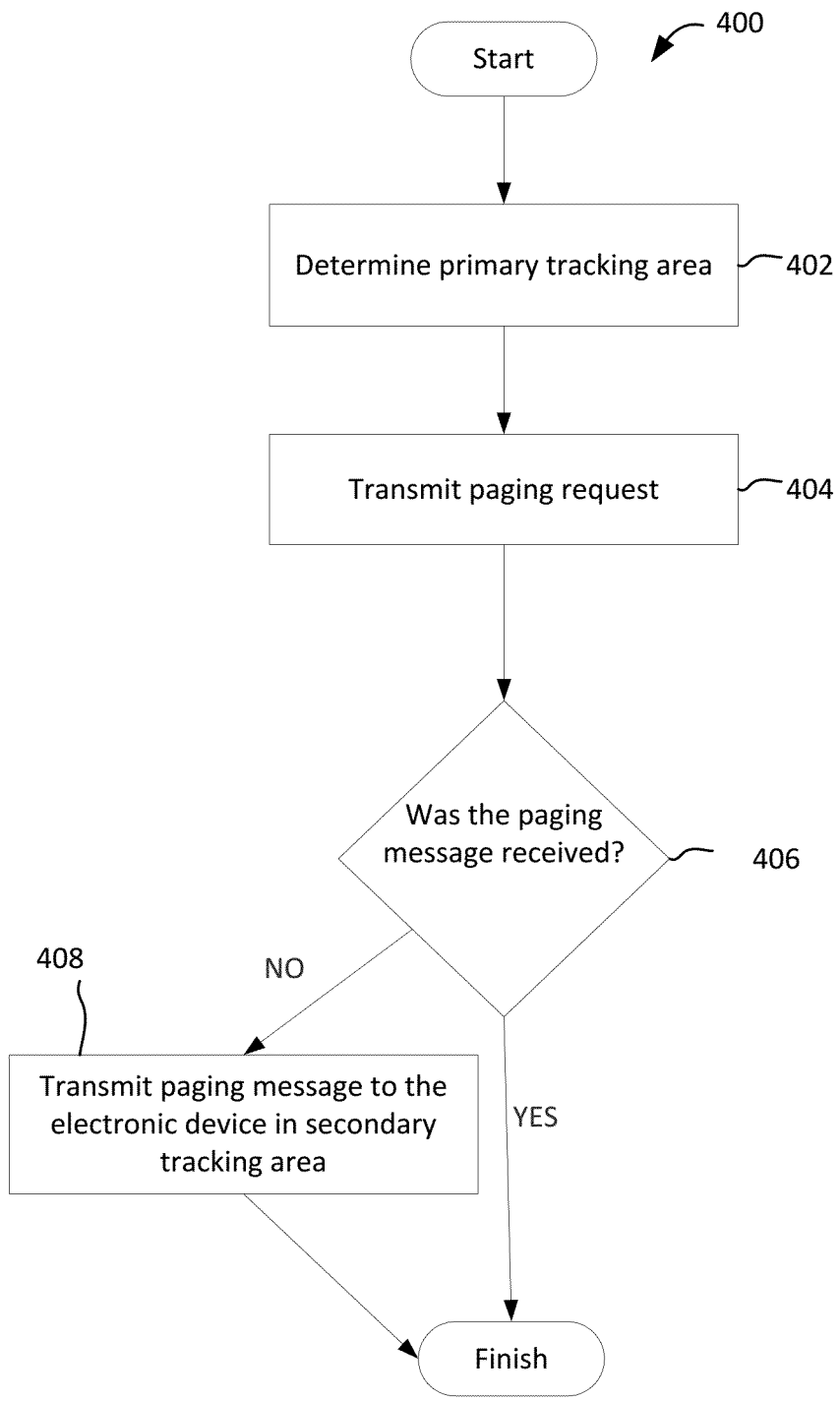

FIG. 4 illustrates a method 400 of paging an electronic device 104 using a profile that does not consider the time of day. For example, the profile for the electronic device 104 may not include any time periods or times of day whatsoever. In other words, the primary tracking area (and secondary tracking area and any other tracking areas) is not associated with any time period.

At 402, a primary tracking area 199 is determined for the electronic device 104. For example, the primary tracking area may be associated with the electronic device 104 in the profile stored in the database 198. The MME 152 may access the profile from the database 198 to determine the primary tracking area associated with the electronic device 104. For example, the primary tracking area may be the most frequently used TA 199 by the electronic device 104 (e.g. as measured within a predefined time period). The most frequently used TA 199 may be the one within which the electronic device 104 established the most connections. One or more primary nodes within the primary tracking area may also be determined.

At 404, a paging message is transmitted to the primary node(s) in the primary tracking area. For example, the MME 152 may access profile for the electronic device 104 (which may be stored in the database 198) that identifies the node(s) 106 that are the primary nodes in the primary tracking area. The MME 152 may then transmit the paging message to the primary node(s). The primary node(s) can then relay or transmit the paging message to the electronic devices 104 in the TA 199 using the paging channel. For example, the primary node(s) may broadcast the paging message to all electronic devices 104 within its vicinity or range.

In one or more embodiments, prior to transmitting the paging message to the primary node(s) in the primary tracking area (at 404), it is determined that the primary tracking area is identified as registered with the electronic device 104. For example, the MME 152 (or another network component) may be able to access the list of TAs 199 that are registered with the electronic device 104 and compare this list with the primary tracking area. This comparison can be used to determine whether the primary tracking area has been registered with the electronic device 104.

If, on the other hand, it is determined that the primary tracking area is not registered with the electronic device 104 then the paging message will not be transmitted to the primary tracking area. Instead, the paging message may be transmitted to the electronic device 104 in the secondary tracking area (at 408, below).

At 406, a determination is made as to whether the paging message was received at the electronic device 104. As described above, the determination may be made by the MME 152 (or another network component) receiving a message back from the electronic device 104 within a predetermined time period or the determination may be made by the MME 152 (or another network component) if a communication channel is established with the electronic device 104 within a predetermined time period. By way of further example, the electronic device 104 may transmit a confirmation message to the MME 152 confirming that the paging message was received.

If the determination is made that the paging message was received at the electronic device 104 then the method 400 is complete.

If the determination is made that the paging message is not received at the electronic device 104, then at 408 the paging message may be transmitted to the electronic device 104 in the secondary tracking area. The secondary tracking area may also not be associated with a time period. For example, the secondary tracking area may be the second most used tracking area by the electronic device 104 and may be stored in the profile of the electronic device 104. One or more secondary node in the secondary tracking area may also be stored in the profile of the electronic device 104. The transmission of the paging message to the electronic device 104 in the secondary tracking area may consist of transmitting the paging message to the secondary node(s) in the secondary tracking area. The secondary nodes can be nodes 106 that are the most used nodes in the secondary tracking area, for example.

In one or more embodiments, prior to transmitting the paging message to the secondary node(s) in the secondary tracking area (at 408), it is determined that the secondary tracking area is identified as registered with the electronic device 104. For example, the MME 152 (or another network component) may be able to access the list of TAs 199 that are registered with the electronic device 104 and compare this list with the secondary tracking area. This comparison can be used to determine whether the secondary tracking area has been registered with the electronic device 104.

If, on the other hand, it is determined that the secondary tracking area is not registered with the electronic device 104 then the paging message will not be transmitted to the secondary tracking area. Instead, the paging message may be broadcast to all nodes 106 in all TAs 199 that are associated with (or registered with) the electronic device or to all nodes 106 in all TAs 199 that are registered with the electronic device 104.

If a further determination is made that the paging message was not received at the electronic device 104 (e.g. in either the primary nodes or secondary nodes), then the MME 152 may broadcast the paging message to all nodes 106 in all TAs 199 that are associated with the electronic device 104 or to all nodes 106 in all TAs 199 that are registered with the electronic device 104. For example, the paging message may be transmitted to all nodes 106 that are associated with the electronic device 104 and each such node 106 can then transmit or relay the paging message to the electronic device 104 (e.g. by broadcasting the paging message within each node's 106 vicinity or range).

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is the following:

1. A method of paging an electronic device when the electronic device is in an idle state, the method comprising:
   determining a time;
   determining a primary tracking area that is associated with a time period in a profile of the electronic device, wherein the time period comprises the determined time;
   selecting a subset of primary nodes from all nodes in the primary tracking area based on determining that the primary nodes are used more often than the nodes in the primary tracking area that are not primary nodes during the time period; and
   transmitting a paging message to the selected primary nodes in the primary tracking area.

2. The method of claim 1, further comprising
   determining that the paging message was not received at the electronic device;
   broadcasting the paging message to all nodes in the primary tracking area.

3. The method of claim 1, further comprising:
   determining that the paging message was not received at the electronic device;
   determining a secondary tracking area that is associated with the time period in a profile of the electronic device; and
   transmitting a paging message to the electronic device in the secondary tracking area.

4. The method of claim 3, further comprising determining one or more secondary nodes in the secondary tracking that are associated with the time period in the profile of the electronic device, and wherein transmitting the paging message to the electronic device in the secondary tracking area comprises transmitting the paging message to the one or more secondary nodes.

5. The method of claim 4, further comprising:
   determining that the paging message was not received at the electronic device;
   broadcasting the paging message to all nodes in the secondary tracking area.

6. The method of claim 4, further comprising:
   determining that the paging message was not received at the electronic device in the secondary tracking area; and
   broadcasting the paging message to all tracking areas that the electronic device is registered with.

7. The method of claim 4, wherein the primary tracking area and the first time period are predetermined based on a known location related to the electronic device.

8. The method of claim 4, wherein the primary tracking area comprises a most used tracking area for the electronic device within a predefined period of time.

9. The method of claim 8, wherein the secondary tracking area comprises a second most used tracking for the electronic device within the predefined period of time.

10. The method of claim 8, wherein a most used tracking area for the electronic device comprises the tracking area from which the electronic device placed the most phone calls within the predefined period of time.

11. The method of claim 1, wherein the profile of the electronic devices comprises an association of the primary tracking area with a first time period and an association of an alternative-time tracking area with an alternative time period.

12. The method of claim 11, wherein the primary tracking area comprises a work location and the alternative-time tracking area comprises a residential location.

13. The method of claim 1, wherein the profile further comprises an association of a specific tracking area with a specific day and wherein the determined time comprises a day.

14. The method of claim 1, further comprising, prior to transmitting a paging message, determining that the primary tracking area is identified as registered with the electronic device.

15. The method of claim 1, further comprising collecting usage data for each node that is registered with the electronic device.

16. A network component for managing the initiation of data transmission to an electronic device when the electronic device is in an idle state, the network component comprising:
   a database for storing profiles;
   a time keeper for keeping time;
   a transmitter; and,
   a processor connected to the database, the time keeper and the transmitter, the processor configured to:
   retrieve a time from the time keeper;
   retrieve a profile of the electronic device from the database;

determine a primary tracking area that is associated with a time period in the profile, wherein the time period comprises the retrieved time;

selecting a subset of primary nodes from all nodes in the primary tracking area based on determining that the primary nodes are used more often than the nodes in the primary tracking area that are not primary nodes during the time period; and instruct the transmitter to transmit a paging message to the selected primary nodes in the primary tracking area.

17. The network component of claim 16, wherein the processor is further configured to:

determine that the paging message was not received at the electronic device;

determine a secondary tracking area that is associated with the time period in a profile of the electronic device; and instruct the transmitter to transmit a paging message to the electronic device in the secondary tracking area.

18. The network component of claim 17, wherein the processor is further configured to:

determine that the paging message was not received at the electronic device in the secondary tracking area; and instruct the transmitter to broadcast the paging message to all tracking areas that the electronic device is registered with.

* * * * *